United States Patent
Ikegami et al.

(10) Patent No.: US 9,624,971 B2
(45) Date of Patent: Apr. 18, 2017

(54) MOTION GUIDE DEVICE

(71) Applicant: THK CO., LTD., Tokyo (JP)

(72) Inventors: Nobuyuki Ikegami, Tokyo (JP); Fumiaki Morita, Tokyo (JP); Yoshiaki Iwashige, Tokyo (JP); Yasuhiro Suga, Tokyo (JP); Mitsumasa Wada, Tokyo (JP); Hiroyuki Kishi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/911,317

(22) PCT Filed: Aug. 25, 2014

(86) PCT No.: PCT/JP2014/072134
§ 371 (c)(1),
(2) Date: Feb. 10, 2016

(87) PCT Pub. No.: WO2015/033813
PCT Pub. Date: Mar. 12, 2015

(65) Prior Publication Data
US 2016/0195131 A1    Jul. 7, 2016

(30) Foreign Application Priority Data
Sep. 5, 2013 (JP) .................................. 2013-184379

(51) Int. Cl.
*F16C 29/06* (2006.01)

(52) U.S. Cl.
CPC .......... *F16C 29/0647* (2013.01); *F16C 29/06* (2013.01); *F16C 29/0609* (2013.01); *F16C 29/0652* (2013.01)

(58) Field of Classification Search
CPC .. F16C 29/0633; F16C 29/0652; F16C 29/06; F16C 29/0609; F16C 29/0647; F16C 29/0611; F16C 29/063

(Continued)

(56) References Cited

U.S. PATENT DOCUMENTS 5,399,023 A * 3/1995 Winkelmann ..... B23Q 11/0875
                                                              384/13
5,492,412 A * 2/1996 Tsukada ................ F16C 29/088
                                                              384/15

(Continued)

FOREIGN PATENT DOCUMENTS

EP    2110571 A2 * 10/2009   .......... F16C 29/0604
JP    5-66329 U      9/1993

(Continued)

OTHER PUBLICATIONS

International Search Report dated Nov. 25, 2014, issued in counterpart Application No. PCT/JP2014/072134 (2 pages).

*Primary Examiner* — Marcus Charles
(74) *Attorney, Agent, or Firm* — Westerman, Hattori, Daniels & Adrian, LLP

(57) ABSTRACT

The motion guide device includes a track member in which a rolling member rolling surface is formed along a longitudinal direction thereof, a movable member which is reciprocally movable with a number of rolling members being interposed therebetween and which is provided with a loaded rolling member rolling surface constituting a loaded rolling member rolling path opposing to the rolling member rolling surface and a rolling member return path, and a lid member provided with a pair of direction changing paths for connecting both end portions of the loaded rolling member rolling path and the rolling member return path to thereby constitute an endless circulation path. Flange portions are formed to both end portions of the movable member in the reciprocally moving direction by means of insert molding, and the flange portions are provided with fitting portions formed to end portion sides of the movable member.

4 Claims, 8 Drawing Sheets

(58) Field of Classification Search
USPC .................................. 384/13, 15, 42–45, 49
See application file for complete search history.

(56) References Cited

U.S. PATENT DOCUMENTS

| | | | | |
|---|---|---|---|---|
| 5,590,965 | A * | 1/1997 | Yabe | F16C 29/0647 |
| | | | | 384/15 |
| 5,951,168 | A * | 9/1999 | Teramachi | F16C 29/0602 |
| | | | | 384/45 |
| 6,019,513 | A * | 2/2000 | Tsukada | F16C 29/0642 |
| | | | | 384/15 |
| 7,862,235 | B2 * | 1/2011 | Yamaguchi | F16C 29/0602 |
| | | | | 384/13 |
| 2002/0039458 | A1 * | 4/2002 | Ishihara | F16C 29/06 |
| | | | | 384/45 |
| 2003/0099414 | A1 * | 5/2003 | Okabe | F16C 29/02 |
| | | | | 384/42 |
| 2006/0029305 | A1 | 2/2006 | Akiyama et al. | |
| 2006/0029307 | A1 * | 2/2006 | Fujimura | F16C 29/0657 |
| | | | | 384/45 |

FOREIGN PATENT DOCUMENTS

| | | | | |
|---|---|---|---|---|
| JP | 8-42568 | A | 2/1996 | |
| JP | 9-42283 | A | 2/1997 | |
| JP | 3-291939 | A | 11/1997 | |
| JP | 10-47344 | A | 2/1998 | |
| JP | 2005-264984 | A | 9/2005 | |
| JP | 2010-78108 | A | 4/2010 | |
| JP | 2010151172 | A * | 7/2010 | .............. F16F 29/06 |
| JP | 5589411 | B2 * | 9/2014 | .............. F16C 29/06 |

* cited by examiner (a)

(b)

(a)

(b)

MOTION GUIDE DEVICE

TECHNICAL FIELD

The present invention relates to a motion guide device provided with a rolling member, performing rolling motion, interposed between a track member and a movable member.

BACKGROUND ART

In conventional art, there is known a motion guide device including a movable member which is assembled to be reciprocally movable along a track member with a plurality of rolling members being interposed therebetween, and an endless circulation path provided for the movable member for guiding an endless circulation motion of the rolling members. The endless circulation path is provided with a rolling member rolling path formed to the track member, a loaded rolling member rolling path formed to the movable member, a non-loaded rolling member rolling path formed to the movable member, and a direction changing path connected to both ends of the loaded rolling member rolling path and the non-loaded rolling member rolling path.

Such motion guide device is composed of various structural members or parts, for example, including a retainer member disposed along a longitudinal direction of both edge portions of the loaded-rolling member rolling path and adapted to prevent separation of the rolling members. The direction changing path is composed of a semi-circular inner peripheral side direction changing path constituting member formed to both end portions in the reciprocally moving direction of the movable member for constituting the inner peripheral portion of the direction changing path and a lid member mounted to the end portion of the movable member so as to cover the direction changing path constituting member and provided with an outer peripheral side direction changing path constituting member for constituting the outer periphery of the direction changing path.

As mentioned above, a conventional motion guide device is provided with many constitutional members or parts, which results in difficulty in simplification of assembling procedure, reduction of members and so on, thus providing inconvenience. In order to avoid such inconveniences, there is known a technology in which a circulation member formed of a resin member is molded to a movable member by means of insertion molding to thereby provide an integral structure.

PRIOR ART DOCUMENT

Patent Document

Patent Document: Japanese Patent Laid-open Publication No. HEI 9-291939

SUMMARY OF THE INVENTION

Problems to be Solved by the Invention

However, in a case when the retainer member and the inner peripheral side direction changing path constituting member are integrally formed with the movable member by means of insertion molding, it is required for the above-described Patent Document 1, in order to prevent leakage of a synthetic resin fused at the insertion molding process onto the loaded rolling member rolling surface, to press so-called cut-off surface (molten resin discharge) formed to the end surface of a movable member body by a mold to thereby prevent protrusion of the synthetic resin on the loaded rolling member rolling surface. Since such cut-off surface may remain as a staged portion of the end surface after the insertion molding, there provides a problem for smoothly continuously connecting the loaded rolling member rolling surface and the direction changing path.

Furthermore, in order to smoothly continuously connect the loaded rolling member rolling surface and the direction changing path, it may be considered that the inner peripheral side direction changing path constituting member is arranged possibly near the edge portion of the loaded rolling member rolling surface, there is a possibility of remaining of a fear such that the synthetic resin infected by the insert molding is generated as burr on the loaded rolling member rolling surface if the above-mentioned cut-off surface is not sufficiently ensured, and in order to remove such burr, it requires to again perform grinding working to the loaded rolling member rolling surface, which increases working process and steps, thus being inconvenient.

The present invention was conceived to solve the problem mentioned above and an object thereof is to provide a motion guide device capable of constituting a smooth endless track having a simple structure and suppressing manufacturing cost by reducing working processes in a case where a resin member such as retainer member is formed integrally with a movable member by an insert, molding process.

Means for Solving the Problem

A motion guide device according to the present invention includes: a track member in which a rolling member rolling surface is formed along a longitudinal direction thereof; a movable member which is assembled to the track member to be reciprocally movable with a number of rolling members being interposed therebetween and which is provided with a loaded rolling member rolling surface constituting a loaded rolling member rolling path opposing to the rolling member rolling surface and a rolling member return path; a lid member provided with a pair of direction changing paths for connecting both end portions of the loaded rolling member rolling path and the rolling member return path to thereby constitute an endless circulation path; and flange portions formed to both end portions of the movable member in the reciprocally moving direction by means of insert molding, wherein the flange portions are provided with fitting portions formed to end portion sides of the movable member, and at least inner periphery surface side direction changing members of the direction changing paths are assembled to the fitting portions.

Effect of the Invention

According to the present invention, even if the resin member is formed integrally with the movable member by the insert molding process, the smooth continuous connection between the loaded rolling member rolling surface and the direction changing path can be realized.

EMBODIMENT FOR CARRYING OUT THE INVENTION

First Embodiment

Hereunder, an embodiment of the motion guide device according to the present invention with reference to the accompanying drawings. Further, it is to be noted that the following embodiment is not limited to the invention defined by appended claims, and all the combination of the subject features of the present embodiment described herein is not essential for the solution of the present invention.

Figure 1:
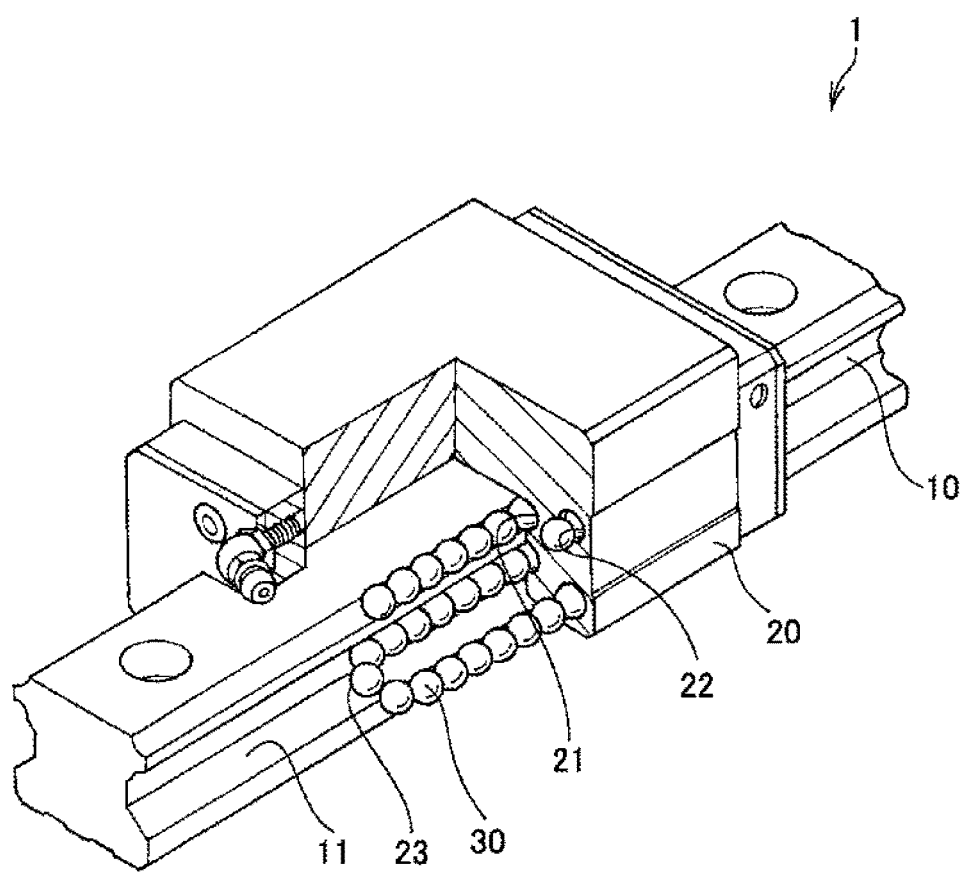
FIG. 1 is a perspective view, partially in section, of a motion guide device according to a first embodiment of the present invention.
Figure 2:
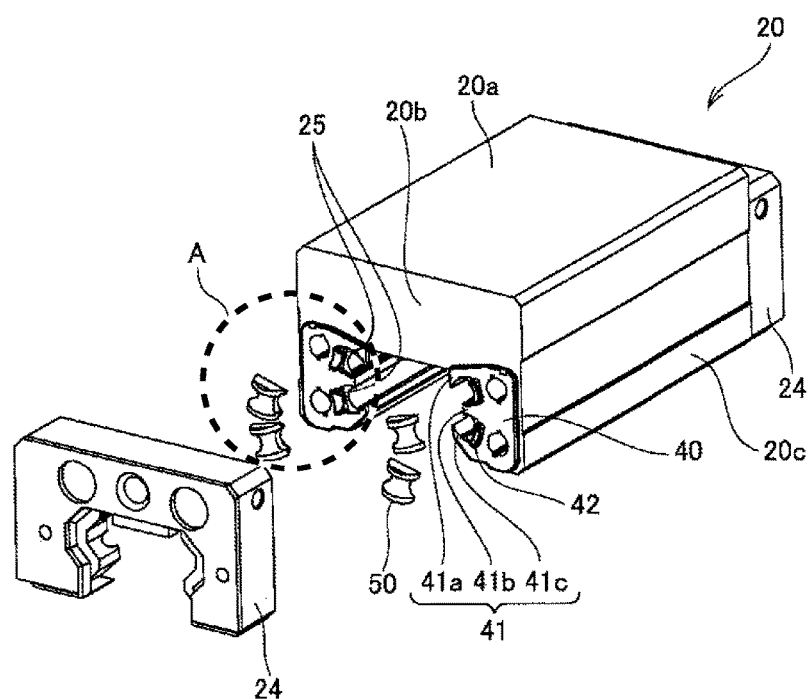
FIG. 2 is a developed view of a movable member of the motion guide device according to the first embodiment of the present invention.
Figure 3:
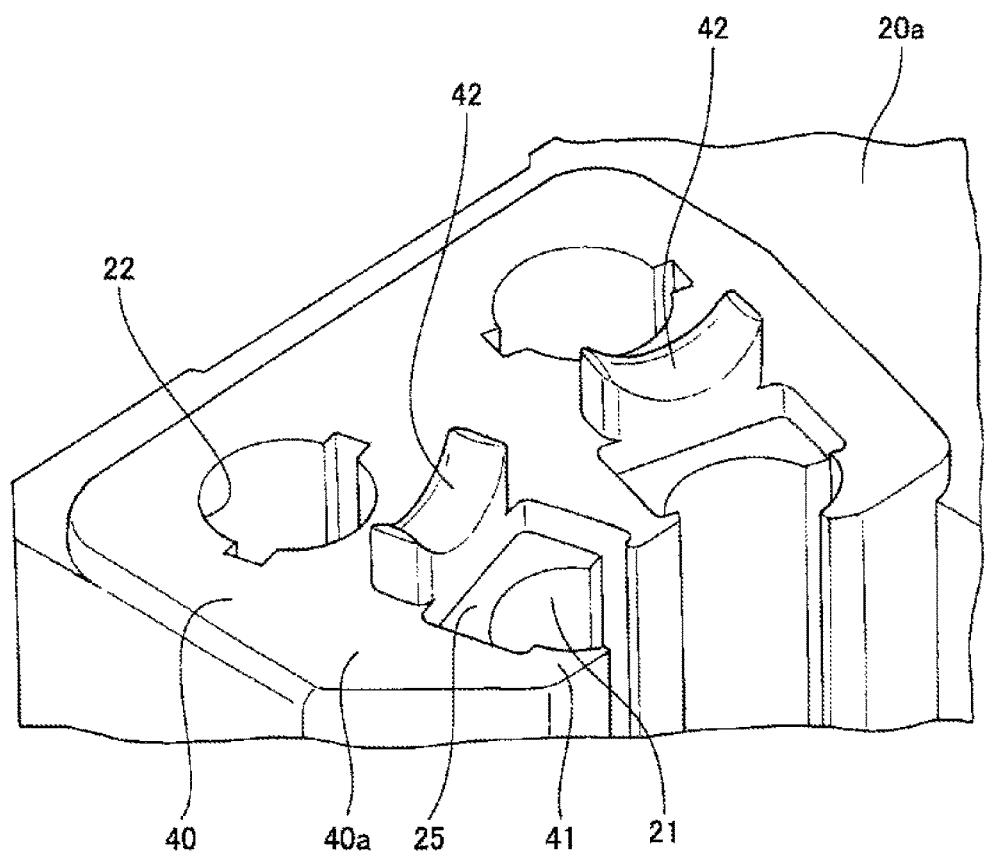
FIG. 3 is an enlarged view of a portion "A" in FIG. 2.
Figure 4:
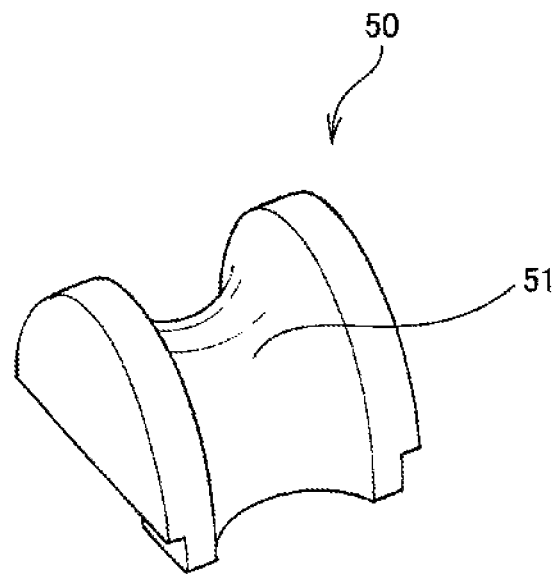
FIG. 4 is a perspective view of a direction changing path constituting member used for the motion guide device according to the first embodiment of the present invention.
Figure 5:
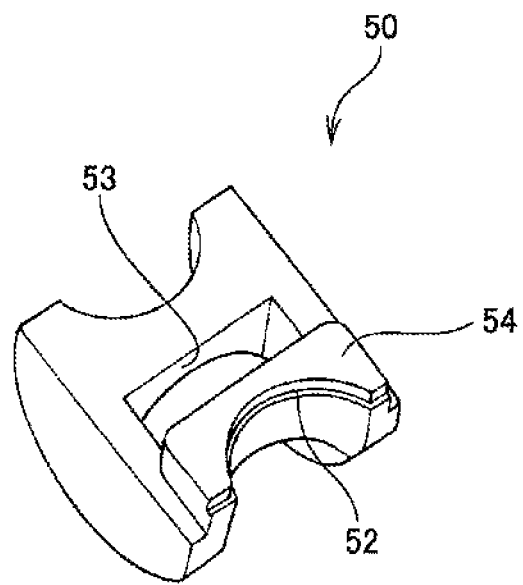
FIG. 5 is a view representing a rear surface of the direction changing path constituting member used for the motion guide device according to the first embodiment of the present invention.
Figure 6:
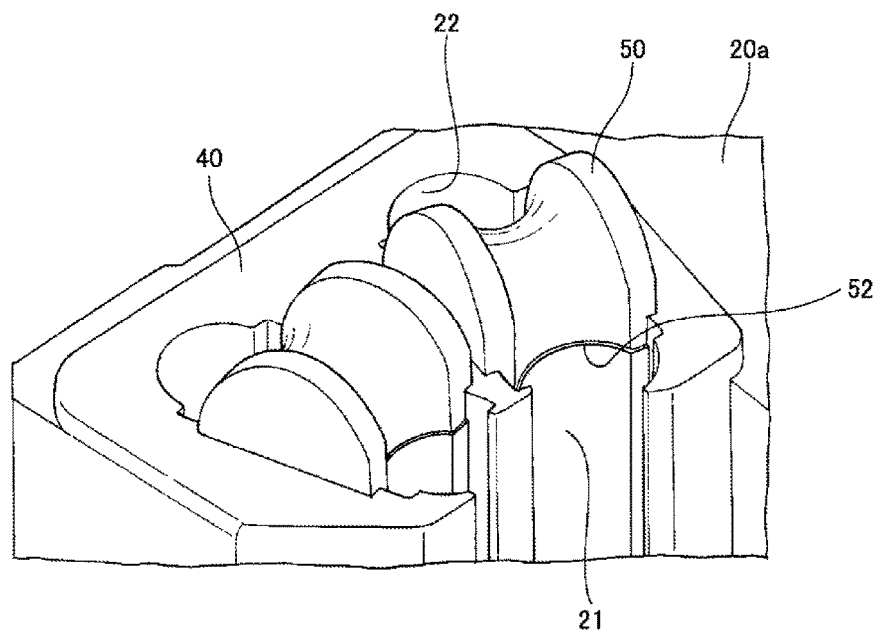
FIG. 6 is a perspective view for explaining an assembled state of the direction changing path constituting member.
Figure 7:
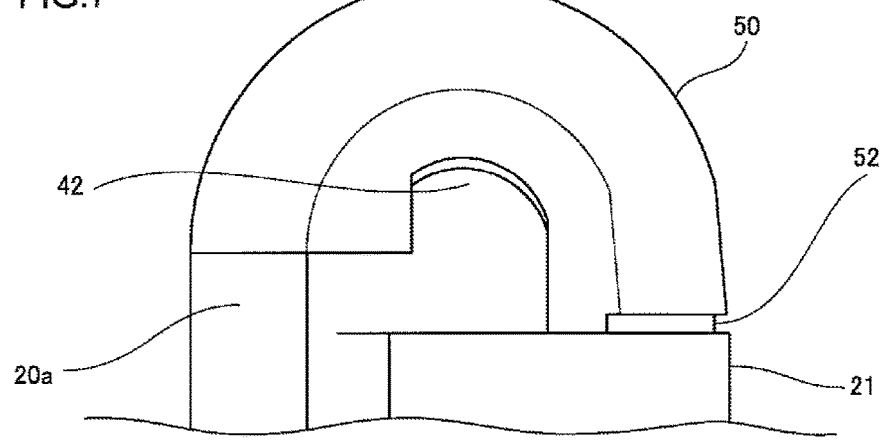
FIG. 7 is a view for explaining a direction changing path of the motion guide device according to the first embodiment of the present invention.

FIG. 1 is a perspective view, partially in section, of a motion guide device according to a first embodiment of the present invention, FIG. 2 is a developed view of a movable member of the motion guide device according to the first embodiment of the present invention, FIG. 3 is an enlarged view of a portion "A" in FIG. 2, FIG. 4 is a perspective view of a direction changing path constituting member used for the motion guide device according to the first embodiment of the present invention, FIG. 5 is a view representing a rear surface of the direction changing path constituting member used for the motion guide device according to the first embodiment of the present invention, FIG. 6 is a perspective view for explaining an assembled state of the direction changing path constituting member, and FIG. 7 is a view for explaining a direction changing path of the motion guide device according to the first embodiment of the present invention.

As shown in FIG. 1, a motion guide device 1 according to the present embodiment is provided with a track member 10 formed with a rolling member rolling surface 11 along the longitudinal direction thereof and a movable member 20 assembled to the track member 10 to be freely reciprocally movable in the longitudinal direction thereof. The movable member 20 is also assembled with the track member 10 with a number of rolling members 30 being interposed therebetween.

The track member 10 has an approximately rectangular shape in section and is provided with vertical two rows of rolling member rolling surfaces in each lateral side surface thereof (totally four rows), which extend in parallel with each other.

As shown in FIG. 2, the movable member 20 has both end surfaces in the longitudinal direction to which lid members 24 are mounted, and the lid member 24 has substantially U-shaped section having a central portion 20b opposing to the upper surface of the track member 10 and a pair of side wall sections 20c, 20c downwardly extending from both end portions of the central portion 20b so as to oppose to both side surfaces of the track member 10. The side wall section 20c is formed with a loaded rolling member rolling surface 21 constituting the loaded rolling member rolling path opposing to the rolling member rolling surface 11. Furthermore, a resin member 40 provided with a retainer member 41 is formed integrally with a main body 20a of the movable member 20 by the insert molding at the side edge portions of the loaded rolling member rolling surface 21, the retainer member 41 including a first retainer section 41a holding the upper side edge portion of the rolling member 30 rolling on the upper side rolling member rolling surface 11, a second retainer section 41b holding the lower side edge portion of the rolling member 30 rolling the upper rolling member rolling surface 11 and the upper side edge portion of the rolling member 30 rolling the lower side rolling member rolling surface 11, and a third retainer section 41c holding the lower side edge portion of the rolling member rolling on the lower side rolling member rolling surface 11.

Furthermore, as shown in FIGS. 2 and 3, the resin member 40 is formed with a rolling member return path 22 arranged substantially in parallel with the vertically arranged two rows of loaded rolling member rolling path with an interval. The loaded rolling member rolling path and the rolling member return path 22 are connected together at both end portions thereof by the direction changing path 23, described hereinafter, to thereby constitute an endless circulation path. In addition, a fitting portion 42, to which a direction changing path constituting member 50, also described hereinafter, is fitted, is formed to the end surface of the resin member 40.

As the rolling member 30, halls each having a predetermined curvature are preferably used, and the balls are arranged in the endless circulation path. Further, the rolling member rolling surface 11 and the loaded rolling member rolling surface 21 have sectional shapes, so-called each in circular-arc shape having a single curvature slightly larger than that of the rolling member 30.

Hereunder, with reference to FIGS. 3 to 7, the direction changing path 23 assembled to the motion guide device 1 of the present embodiment will be explained. The direction changing path 23 has a structure so as to connect both the end portions of the loaded rolling member rolling path and the rolling member return path 22 as described hereinbefore, and the direction changing path constituting member 50 constitutes the inner peripheral surface thereof and an outer peripheral surface is formed by a surface of the lid member 24 opposing to the movable member body 20a.

Herein, as shown in FIG. 3, the resin member 40 is provided with a flange portion 40a formed by the insert molding along the both end portions in the reciprocally moving direction of the movable member body 20a from the loaded rolling member rolling surface 21 via the cut-off surface 25 and also provided with the fitting portion 42 formed to end portion side of the movable member body 20a so as to protrude from the flange portion 40a. Further, the movable member body 20a is formed with a through hole being formed as the rolling member return path 22, and the inner peripheral surface of the through hole is coated with the resin member 40.

The fitting portion 42 is formed to provide approximately a circular-arc shape having a central portion at the direction changing path so as to accord with the shape of the rolling member 30 and both end portions disposed at higher positions, and the direction changing path constituting member 50 is fitted to this fitting portion 42.

The direction changing path constituting member 50 is a semi-columnar member having an outer peripheral surface to which a direction changing path inner peripheral surface 51 in form of a circular-arc-shaped recess is formed so that the rolling member 30 is capable of being rolled. Further, a recessed groove 52 recessed in the direction of the rolling member return path along the width direction of the direction changing path inner peripheral surface 51 is formed to the end surface of the direction changing path inner peripheral surface 51 on the side connecting to the loaded rolling member rolling surface 21. Furthermore, as shown in FIG. 5, an engaging portion 54 abutting against a fitting recessed portion 53 and the cut-off surface 25 is formed to a surface opposing to the resin member 40 of the direction changing path constituting member 50.

The fitting recessed portion 53 is formed so as to provide approximately rectangular shape so that the fitting portion 42 can be fitted, and has a central portion having a shallow depth and both end portion having a deep depth. As mentioned above, since the fitting recessed portion 53 is formed so as to have a central portion having a shallow depth and both end portion having a deep depth along the inner peripheral surface 51 of the direction changing path, the thickness of a position at which the direction changing path inner peripheral surface 51 can be substantially even, thus achieving the relief recess function and preventing deformation of the shape by shrinkage of the synthetic resin at the resin molding process.

The thus formed direction changing path constituting member 50 is, as shown in FIGS. 6 and 7, fitted with the fitting portion 42 of the resin member 40 and the fitting recessed portion 53 of the direction changing path constituting member 50 to thereby being mounted to the end surface of the movable member body 20a. In addition, since the direction changing path constituting member 50 is mounted to the end surface of the movable member body 20a so that the engaging portion 54 covers the cut-off surface 25, even if the resin member 40 provided with the retainer member 41 is insert-molded to the movable member body 20a, the cut-off surface 25 can be appropriately ensured, so that the resin member 40 can be surely insert-molded to the movable member body 20a, and in addition, the direction changing path constituting member 50 can be smoothly connected and communicated with the loaded rolling member rolling path and the rolling member return path 22 without the end portion of the cut-off surface 25 being protruded, as staged portion, into the endless track and without performing the grinding working before and after the insert molding process.

Furthermore, as shown in FIG. 7, the direction changing path constituting member 50 is formed with the recessed groove 52 at, the position connected to the loaded rolling member rolling surface 21, so that even if a small staged portion is formed between the loaded rolling member rolling surface 21 and the direction changing path inner peripheral surface 51, the recessed groove 52 serves to achieve escape function, and such staged portion does not, obstruct the rolling motion of the rolling member 30 rolling in the endless circulation path.

Second Embodiment

For the motion guide device 1 of the first embodiment mentioned above, the motion guide device 1 using the balls as the rolling members 30 was explained. On the other hand, a motion guide device according to the second embodiment, has an exemplary mode different from that of the first embodiment. It is further to be noted that same or like reference numerals are added to members or portions corresponding to those in the first embodiment, and detailed explanations thereof are hence omitted herein.

Figure 8:
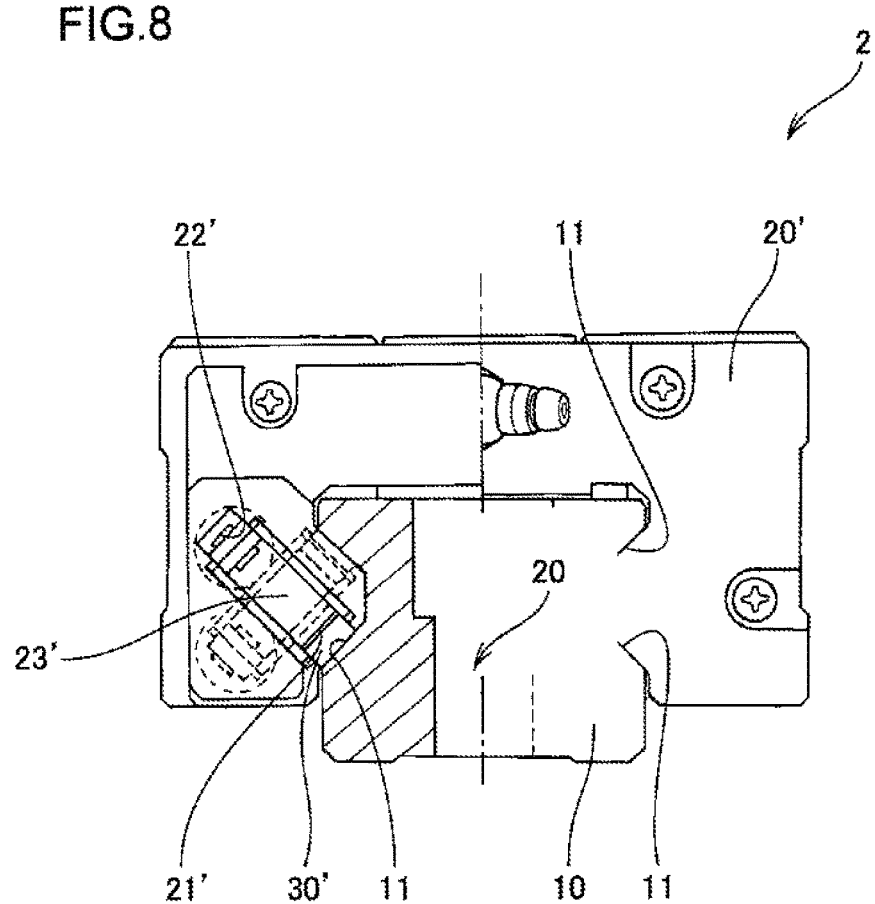
FIG. 8 is a front view of a motion guide device according to a second embodiment of the present invention.
Figure 9:
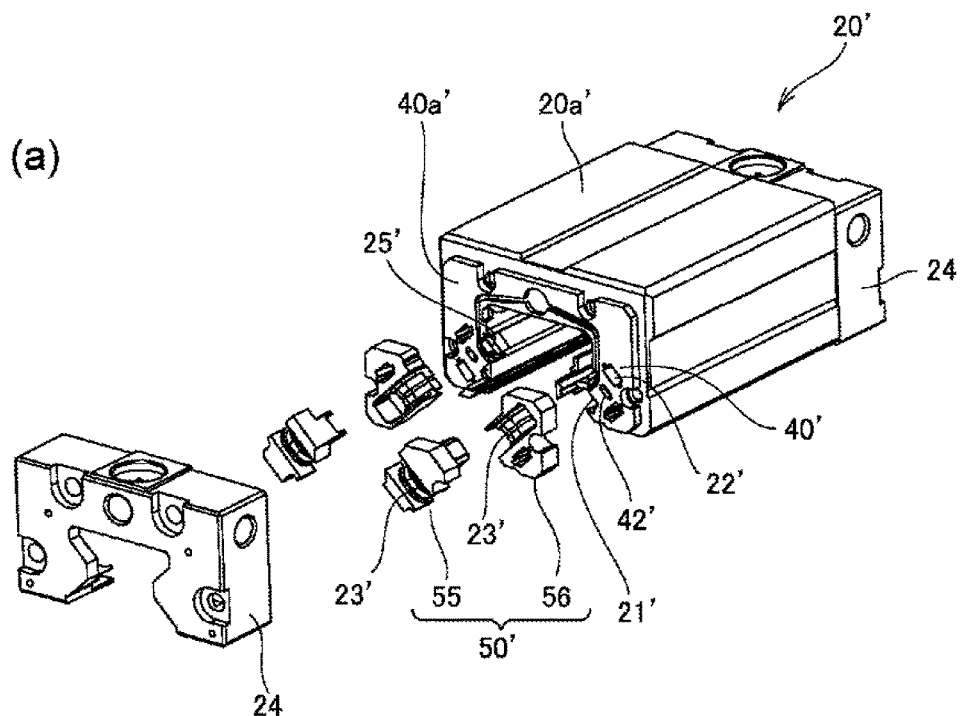
FIG. 9 (a) is a developed view of a movable member of the motion guide device according to the second embodiment of the present invention, and (b) is an enlarged view corresponding to FIG. 3.
Figure 9:
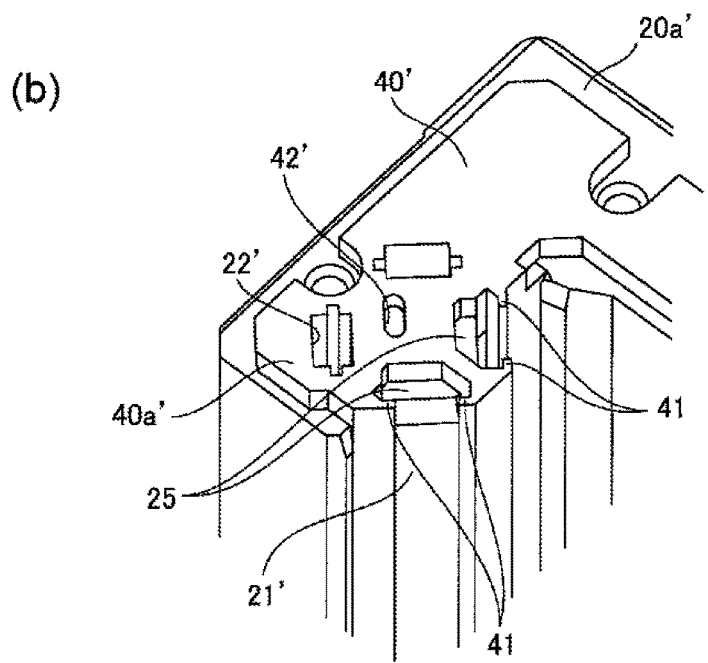
Figure 10:
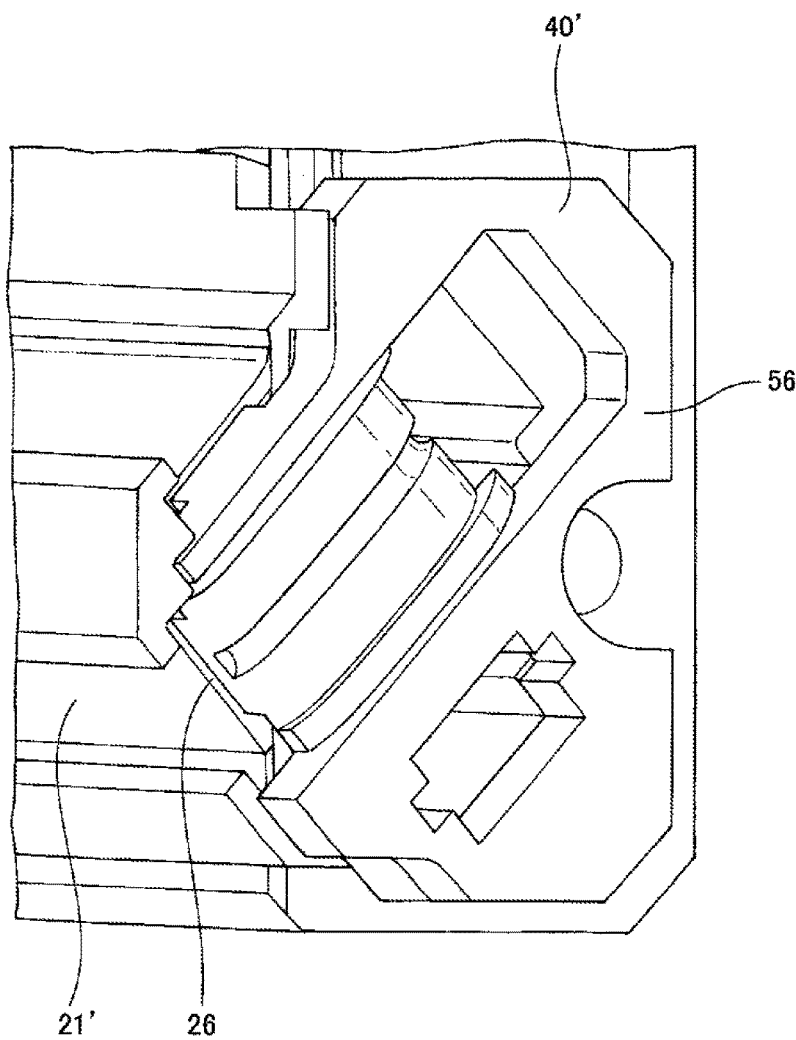
FIG. 10 (a) is a perspective view for explaining an assembled state of the direction changing path constituting member, and (b) is a schematic view of for explaining the assembled state of the direction changing path constituting member.
Figure 10:
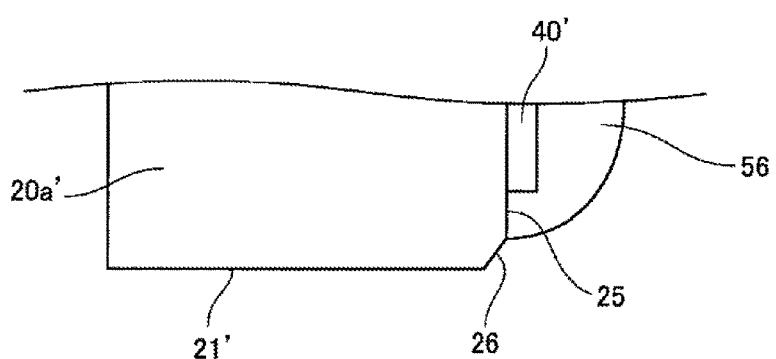

FIG. 8 is a front view of a motion guide device according to a second embodiment of the present invention, FIG. 9 (a) is a developed view of a movable member of the motion guide device according to the second embodiment of the present invention, and (b) is an enlarged view corresponding to FIG. 3, and FIG. 10 (a) is a perspective view for explaining an assembled state of the direction changing path constituting member, and (b) is a schematic view of for explaining the assembled state of the direction changing path constituting member.

As shown in FIG. 8, the motion guide device 2 according to the second embodiment is formed with vertical two rows of rolling member rolling surfaces to both the side surfaces of the track member 10, respectively, and columnar rollers 30' are used as rolling members.

The rolling members 30' are arranged in an endless circulation path, which is composed of a loaded rolling member rolling path including the rolling member rolling surface 11 and a loaded rolling member rolling surface 21' formed to a movable member body 20' and a direction changing path 23' connecting a rolling member return path 22' and both end portions of the loaded rolling member rolling path and the rolling member return path 22', with rotating axes thereof being parallel with each other. The number of rollers 30' are connected in series with roller retainers being interposed therebetween in a manner of being held to be rotatable and slidable by means of the roller retainers while circulating in the endless circulation path.

As shown in FIG. 9(a), the movable member 20' has the movable member body 20a' to which the loaded rolling member rolling surface 21' is formed, and a resin member 40' provided with retainer members 41' formed to both side edge portions of the loaded rolling member rolling surface 21' is integrally formed with such movable member body 20a' by the insert, molding process. Further, as shown in FIG. 9(b), the resin member 40' is provided with a flange portion 40a' formed along the end surface of the movable member body 20a' from the loaded rolling member rolling surface 21' via a cut-off surface 25' and a fitting portion 42' formed to the flange portion 40a' in form of recess. A rolling member return path 22' formed to the movable member body 20a' is provided as a through hole having an inner peripheral surface covered by the retainer member 40'.

The direction changing path 23' has a configuration in which the vertically arranged loaded rolling member rolling paths intersect each other so as to provide a U-shape, in which the upper side loaded rolling member rolling path is continuously connected with the lower side rolling member return path 22', and the lower side loaded rolling member rolling path is continuously connected with the upper side rolling member return path 22', and is constituted by a direction changing path constituting member 50' composed of the inner side inner periphery guide portion constituting member 56 and an outer side inner periphery guide portion constituting member 55.

The inner side inner periphery guide portion constituting member 56 is formed with an inner periphery guide portion of the direction changing path 23' of the inner periphery side endless circulation path, and the outer side inner periphery guide portion constituting member 55 is formed with an outer periphery guide portion of the direction changing path 23' of the inner periphery side endless circulation path and an inner periphery guide portion of the direction changing path of the outer periphery side endless circulation path. Further, The outer periphery guide portion of the direction changing path 23' of the outer periphery side endless circulation path is formed to a surface opposing to the movable member body 20a' of the lid member 24.

As shown in FIG. 10(a), the inner side inner periphery guide portion constituting member 56 is assembled so as to cover the cut-off surface 25 formed to the movable member body 20a' by inserting the protruded portion formed to the inner side inner periphery guide portion constituting member 56 into the fitting portion 42' formed to the resin member 40'. Furthermore, as shown in FIG. 10(b), in the motion guide device 2 according to the present embodiment, the end portion of the movable member body 20a' of the loaded rolling member rolling surface 21' is effected with chamfering processing by an inclining surface 26 so as to avoid intersection at an acute angle between the cut-off surface 25 and the loaded rolling member rolling surface 21', and in addition, by assembling the inner side inner periphery guide portion constituting member 56 so as to cover the cut-off surface 25, any staged portion is not formed between the loaded rolling member rolling surface 21' and the direction changing path 23', and according to such assembling manner, the loaded rolling member rolling surface 21' and the direction changing path 23 can be smoothly connected.

Furthermore, the inclining surface 26 between the loaded rolling member rolling surface 21' and the cut-off surface 25 can be worked before the insert molding of the resin member 40' into the movable member body 20a', so that even if the resin member 40' is insert-molded, the cut-off surface 25 can be properly ensured, and by working the inclining surface 26, the loaded rolling member rolling surface 21' and the direction changing path 23' can be smoothly continuously connected.

Further, the present invention is not limited to the embodiments described above, and various changes or alternations may be made without departing from the subject of the present invention. For example, in the motion guide device 1 of the first embodiment, the direction changing path constituting member 50 is provided independently for each endless track, but at least adjacent direction changing path constituting members may be integrally coupled together by means of plate like member. In such example, since the positioning of the direction changing path constituting members can be integrally performed, the performance and accuracy of the positioning of the direction changing path constituting members can be improved.

Furthermore, in the first and second embodiment, although two rows of rolling member rolling surface are formed in the upper surface of the track member 10 and one row thereof is formed in each side surface thereof (i.e., totally four rows), or two rows thereof are formed in each of the lateral side surfaces (totally four rows), the number and arrangement of the endless circulation path are not limited to such embodiment, and for example, it may be possible to form one row of rolling member rolling surface in each side surface, or more than four rows thereof may be formed.

Still furthermore, for the first embodiment, there is disclosed an example in which the fitting recessed portion 53 is formed to the direction changing path constituting member 50 and the protruded fitting portion 42 is formed to the resin member, and also, for the second embodiment, there is disclosed an example in which the protruded portion is formed to the inside inner periphery guide portion constituting member 56 and a recessed fitting portion 42' is formed to the resin member 40'. However, the formations of such protruded portions and recessed portions may be alternately formed to the corresponding members mentioned above.

Still furthermore, in the first embodiment, although the rolling member rolling surface 11 and the loaded rolling member rolling surface 21 are formed to provide so-called circular-arc shape, the sectional areas of the rolling member rolling surface 11 and the loaded rolling member rolling surface 21 are not limited to such shape, and for example, they may be formed so-called gothic-arch shape in which two circular arcs are combined. It, will be apparent from the recitation of the appended claims that these and other alternations or modifications of embodiments may be included in the technical scopes of the present invention.

REFERENCE NUMERALS 1, 2—motion guide device, 10—track member, 11—rolling member rolling surface, 20, 20'—movable member, 21, 21'—loaded rolling member rolling surface, 22, 22'—rolling member return path, 23, 23'—direction changing path, 25, 25'—cut-off surface, 30, 30'—rolling member, 40, 40'—resin member, 40a—flange portion, 41—retainer member, 42, 42'—fitting portion, 50, 50'—direction changing path constituting member, 52—recessed groove.

The invention claimed is:

1. A motion guide device, comprising:
a track member in which a rolling member rolling surface is formed along a longitudinal direction thereof;
a movable member which is assembled to the track member to be reciprocally movable with a number of rolling members being interposed therebetween and which is provided with a loaded rolling member rolling surface constituting a loaded rolling member rolling path opposing to the rolling member rolling surface and a rolling member return path;
a lid member provided with a pair of direction changing paths for connecting both end portions of the loaded rolling member rolling path and the rolling member return path to thereby constitute an endless circulation path; and
flange portions formed to both end portions of the movable member in the reciprocally moving direction,
wherein a resin member is coated on the inner peripheral surface of the rolling member rolling path and provided integrally with the flange portion,
the flange portions are provided with fitting portions formed to end portion sides of the movable member, and a direction changing member which forms at least inner periphery surface side of the direction changing path constituting member is assembled to the fitting portions, and
wherein the direction changing path constituting member is assembled to a cut-off surface.

2. The motion guide device according to claim 1, wherein one of the direction changing paths is connected to the loaded rolling member rolling path and another one thereof is connected to the rolling member return path through the flange portion.

3. The motion guide device according to claim 1, wherein the direction changing path constituting member is formed with a recessed groove recessed in a rolling member return path direction to a position connected to the loaded rolling member rolling path.

4. The motion guide device according to claim 1, wherein a plurality of endless circulation paths are formed, and the direction changing path constituting member assembled to one end side of the movable member is provided with a plate member integrally forming at least adjacent direction changing path constituting members together.

* * * * *